United States Patent
Omanovic et al.

(10) Patent No.: US 11,203,295 B2
(45) Date of Patent: Dec. 21, 2021

(54) REARVIEW HEAD UP DISPLAY

(71) Applicant: Panasonic Automotive Systems Company of America, Division of Panasonic Corporation of North America, Peachtree City, GA (US)

(72) Inventors: Edo Omanovic, West Bloomfield, MI (US); David Kay Lambert, Sterling Heights, MI (US); Walter Joseph Nill, Davison, MI (US); Gerald Anthony Tang-Kong, Newnan, GA (US); Peter Clarence Sohlden, Shelby Township, MI (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 533 days.

(21) Appl. No.: 15/942,877

(22) Filed: Apr. 2, 2018

(65) Prior Publication Data
US 2018/0297522 A1    Oct. 18, 2018

Related U.S. Application Data

(60) Provisional application No. 62/485,640, filed on Apr. 17, 2017.

(51) Int. Cl.
*B60R 1/00* (2006.01)
*B60K 35/00* (2006.01)
*B60R 11/04* (2006.01)

(52) U.S. Cl.
CPC .............. *B60R 1/00* (2013.01); *B60K 35/00* (2013.01); *B60R 11/04* (2013.01); *B60K 2370/152* (2019.05); *B60K 2370/165* (2019.05); *B60K 2370/21* (2019.05); *B60K 2370/334* (2019.05); *B60K 2370/66* (2019.05); *B60K 2370/777* (2019.05); *B60R 2300/205* (2013.01); *B60R 2300/8066* (2013.01)

(58) Field of Classification Search
None
See application file for complete search history.

(56) References Cited

U.S. PATENT DOCUMENTS

| | | | | |
|---|---|---|---|---|
| 4,711,544 A | * | 12/1987 | Iino | G02B 27/01 345/7 |
| 4,961,625 A | * | 10/1990 | Wood | G02B 27/01 359/630 |
| 5,414,439 A | * | 5/1995 | Groves | B60R 1/00 250/330 |
| 5,506,595 A | * | 4/1996 | Fukano | B60K 35/00 345/7 |
| 5,966,132 A | * | 10/1999 | Kakizawa | A63F 13/10 345/419 |

(Continued)

*Primary Examiner* — Curtis J King
(74) *Attorney, Agent, or Firm* — Laurence S. Roach, Esq.

(57) ABSTRACT

A motor vehicle includes a rearview camera capturing images of a scene behind the motor vehicle. An electronic processor receives the images captured by the camera. A virtual image projection arrangement is communicatively coupled to the electronic processor and presents a virtual image dependent upon the images captured by the camera. The virtual image is visible by a driver of the vehicle after being reflected by a windshield.

18 Claims, 3 Drawing Sheets

(56) References Cited

U.S. PATENT DOCUMENTS

| | | | | |
|---|---|---|---|---|
| 6,348,877 B1* | 2/2002 | Berstis | G01C 23/005 | 340/961 |
| 6,402,321 B1* | 6/2002 | Harter, Jr. | G02B 27/0101 | 345/7 |
| 6,447,132 B1* | 9/2002 | Harter, Jr. | G01D 11/28 | 345/102 |
| 6,574,048 B2* | 6/2003 | Nill | G02B 27/0101 | 345/7 |
| 6,646,810 B2* | 11/2003 | Harter, Jr. | G02B 27/01 | 359/13 |
| 6,789,901 B1* | 9/2004 | Kormos | G02B 27/0101 | 345/9 |
| 2003/0169491 A1* | 9/2003 | Bender | G02B 27/0101 | 359/356 |
| 2008/0088526 A1* | 4/2008 | Kadantseva | G02B 27/01 | 345/1.1 |
| 2009/0225434 A1* | 9/2009 | Nicholas | B60R 1/00 | 359/630 |
| 2009/0243824 A1* | 10/2009 | Peterson | B60R 1/12 | 340/435 |
| 2010/0253494 A1* | 10/2010 | Inoue | G01C 21/36 | 340/436 |
| 2011/0001932 A1* | 1/2011 | Zuehlsdorff | G01C 21/3632 | 353/14 |
| 2011/0074957 A1* | 3/2011 | Kiyohara | G06K 9/342 | 348/148 |
| 2013/0177237 A1* | 7/2013 | Schamp | G06K 9/00805 | 382/154 |
| 2013/0251193 A1* | 9/2013 | Schamp | G06K 9/00201 | 382/103 |
| 2013/0251194 A1* | 9/2013 | Schamp | G06T 7/11 | 382/103 |
| 2013/0307706 A1* | 11/2013 | Kriezman | H04N 9/3141 | 340/988 |
| 2014/0168608 A1* | 6/2014 | Disley | G03B 29/00 | 352/132 |
| 2014/0368544 A1* | 12/2014 | Kobayashi | G02B 27/0101 | 345/633 |
| 2015/0319608 A1* | 11/2015 | Varughese | H04W 4/046 | 455/456.4 |
| 2016/0034771 A1* | 2/2016 | Schamp | G01B 11/2545 | 348/148 |
| 2016/0266283 A1* | 9/2016 | Segawa | G02B 3/0006 | |
| 2017/0088053 A1* | 3/2017 | Orellana | B60Q 9/008 | |
| 2017/0091559 A1* | 3/2017 | Hurtado | H04N 7/181 | |
| 2017/0163863 A1* | 6/2017 | Gomez Timoneda | B60R 1/00 | |
| 2017/0269352 A1* | 9/2017 | Hashiguchi | G02B 26/0858 | |
| 2017/0302914 A1* | 10/2017 | Tonar | H04N 13/305 | |
| 2017/0315771 A1* | 11/2017 | Kerr | G06F 3/1446 | |
| 2018/0011314 A1* | 1/2018 | Quiroz de la Mora | G02B 27/0101 | |
| 2018/0088326 A1* | 3/2018 | Lambert | G02B 27/0101 | |
| 2018/0101009 A1* | 4/2018 | Lambert | G02B 27/0103 | |
| 2018/0172993 A1* | 6/2018 | Nill | G02B 27/0101 | |
| 2018/0178729 A1* | 6/2018 | Festerling, Jr. | B60R 1/00 | |
| 2018/0270406 A1* | 9/2018 | Bareman | H04N 5/23203 | |

* cited by examiner

REARVIEW HEAD UP DISPLAY

CROSS-REFERENCE TO RELATED APPLICATION

This application claims benefit of U.S. Provisional Application No. 62/485,640 filed on Apr. 14, 2017, which the disclosure of which is hereby incorporated by reference in its entirety for all purposes.

BACKGROUND OF THE INVENTION

1. Field of the Invention

The present invention relates to rearview displays in a motor vehicle, and to head up displays in a motor vehicle.

2. Description of the Related Art

Conventional rearview mirrors often reflect distractingly bright headlights of other vehicles into the eyes of the driver. Moreover, while a rearview mirror allows the driver to view their surroundings without having to refocus, a rearview mirror has the disadvantage of potentially being obstructed by the vehicle environment. For example, the view provided by a rearview mirror can be easily blocked by vehicle passengers, by large items disposed within the passenger compartment, and by frost or snow on the rear window.

Display-based mirror substitute technologies like intelligent rearview mirror system (IRMS) enable a range of desirable features and functions to the driver. However, because IRMS uses a direct view display that is close to the driver's eyes, the driver must refocus between viewing the outside front scene and the display. When the driver is focusing on the road ahead, it takes a significant amount of time to change the focus to a much shorter distance, and the driver may experience discomfort.

SUMMARY OF THE INVENTION

The present invention may provide virtual image projection apparatus, such as a head up display (HUD), to enable a driver of a motor vehicle to view the scene behind the vehicle. That is, the head up display may present an image similar to that presented by a conventional rearview mirror. The invention may enable the driver to see behind the vehicle even when their view is obstructed by passengers or items within the vehicle. The rear window can be covered or blocked without compromising the ability of the driver to see behind the vehicle. The driver's field of view is not constrained by the geometry of the vehicle cabin, or by the geometry of the rear window. The field of view can be increased so that more area is visible to the driver than with a regular rearview mirror.

The use of a head up display instead of a direct view display may enable the driver to change their glance direction between the rearview scene and the forward scene without the time delay associated with refocusing. This is expected to improve traffic safety by making the driver more aware of their surroundings. The invention also eliminates the driver discomfort associated with rapidly changing focus of their eyes between a nearby display and the outside scene.

In one embodiment, the present invention comprises a motor vehicle including a rearview camera capturing images of a scene behind the motor vehicle. An electronic processor receives the images captured by the camera. A virtual image projection arrangement is communicatively coupled to the electronic processor and presents a virtual image dependent upon the images captured by the camera. The virtual image is visible by a driver of the vehicle after being reflected by a windshield.

In another embodiment, the present invention comprises a method of presenting information to a driver of a motor vehicle having a windshield, including capturing images of a scene behind the motor vehicle. A virtual image is presented dependent upon the captured images. The virtual image is visible by a driver of the vehicle after being reflected by the windshield and appears to the driver to be at least two meters away from the driver.

In yet another embodiment, the present invention comprises a motor vehicle including a rearview camera configured to capture images of a scene behind the motor vehicle. An electronic processor receives the images captured by the camera and produces a video signal based upon the captured images. A flat panel display is communicatively coupled to the electronic processor, receives the video signal, and produces a light field dependent upon the video signal. A concavely curved reflective surface is positioned to reflect the light field toward eyes of a driver of the motor vehicle.

An advantage of the present invention is that it may eliminate the need for a driver to refocus their eyes between a distant focal point on the road in front of them and an IRMS display that is located within the passenger compartment.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

DETAILED DESCRIPTION OF DRAWINGS

The embodiments hereinafter disclosed are not intended to be exhaustive or limit the invention to the precise forms disclosed in the following description. Rather the embodiments are chosen and described so that others skilled in the art may utilize its teachings.

Figure 1:
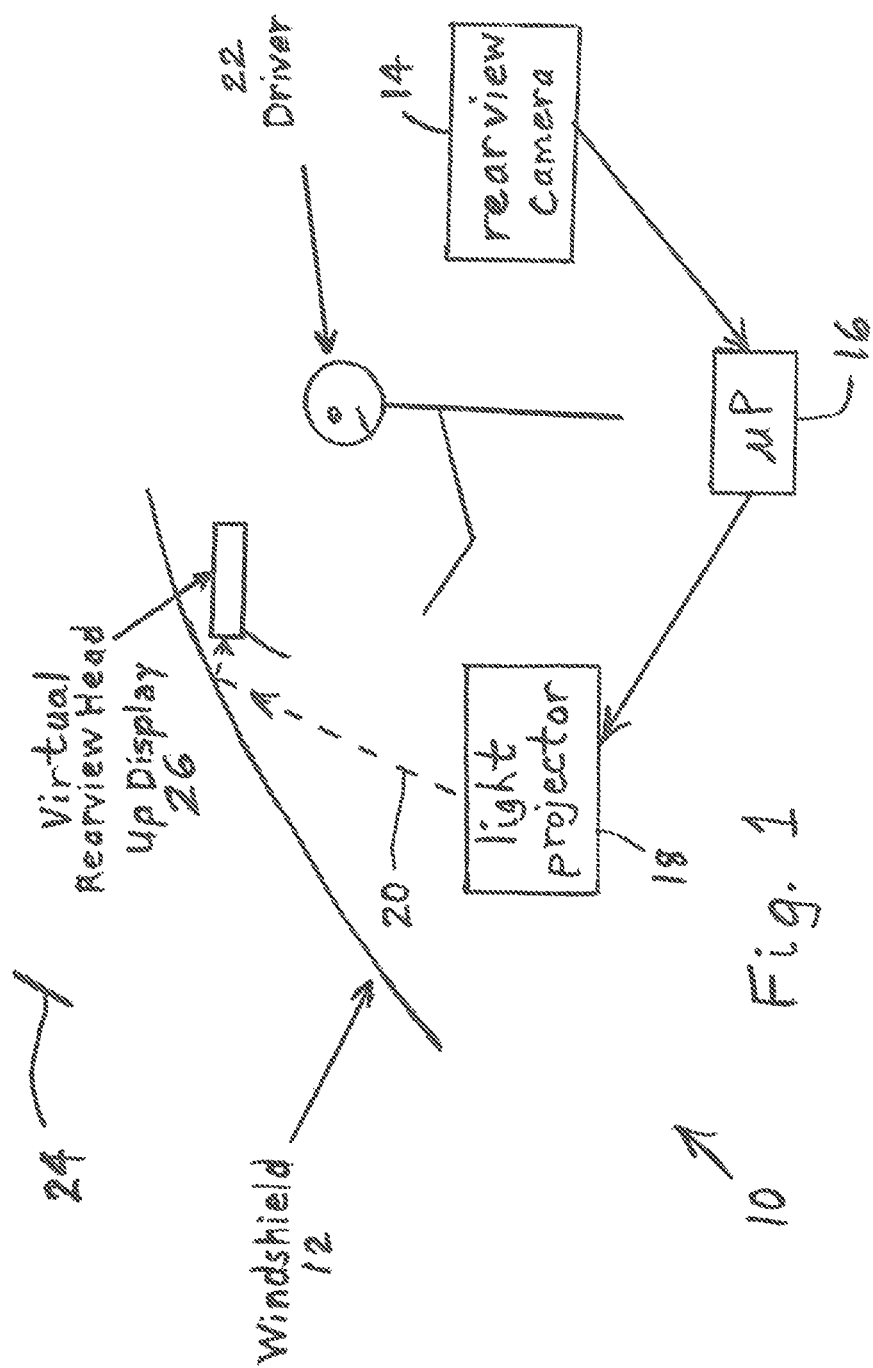
FIG. 1 is a schematic diagram of one embodiment of a rearview head up display arrangement of the present invention.

FIG. 1 illustrates one embodiment of a rearview head up display arrangement 10 of the present invention, including a windshield 12, a rearview camera 14, an electronic processor 16, and a head up display light projector module 18, all of which may be installed on and/or disposed within a same motor vehicle. Rearview camera 14 may be mounted on a rear bumper of the vehicle, for example, and may capture images of a scene behind the vehicle. The captured images may be transmitted to processor 16 where the images are processed and transformed into a video signal that is transmitted to light projector 18. Light projector 18 may project a light field 20 based upon the received video signal. Light field 20 is reflected off of an inner surface of windshield 12 and may appear to a human driver 22 as a virtual image 24 disposed outside of windshield 12. Virtual image 24 may be simply a reproduction of the images captured by rearview camera 14, or may be mirror images of the images captured by rearview camera 14 to thereby mimic the images seen in a conventional rearview mirror.

In another embodiment, and dependent upon the characteristics of windshield 12 and/or light field 20, the virtual image resulting from the reflection of light field 20 may appear to be a virtual rearview head up display 26 disposed in approximately the same location within the vehicle as would be occupied by a conventional rearview mirror. That is, virtual display 26 may be positioned near the conventional position of the rearview mirror, as shown in FIG. 1. For example, the virtual head up display 26 may be a windshield display that reflects from windshield 12 near where the rearview mirror would ordinarily be located. In addition to a video signal based upon the captured camera images of the rearview scene, the virtual images presented to the driver by the head up display may include alphanumeric text information and icons.

Figure 2:
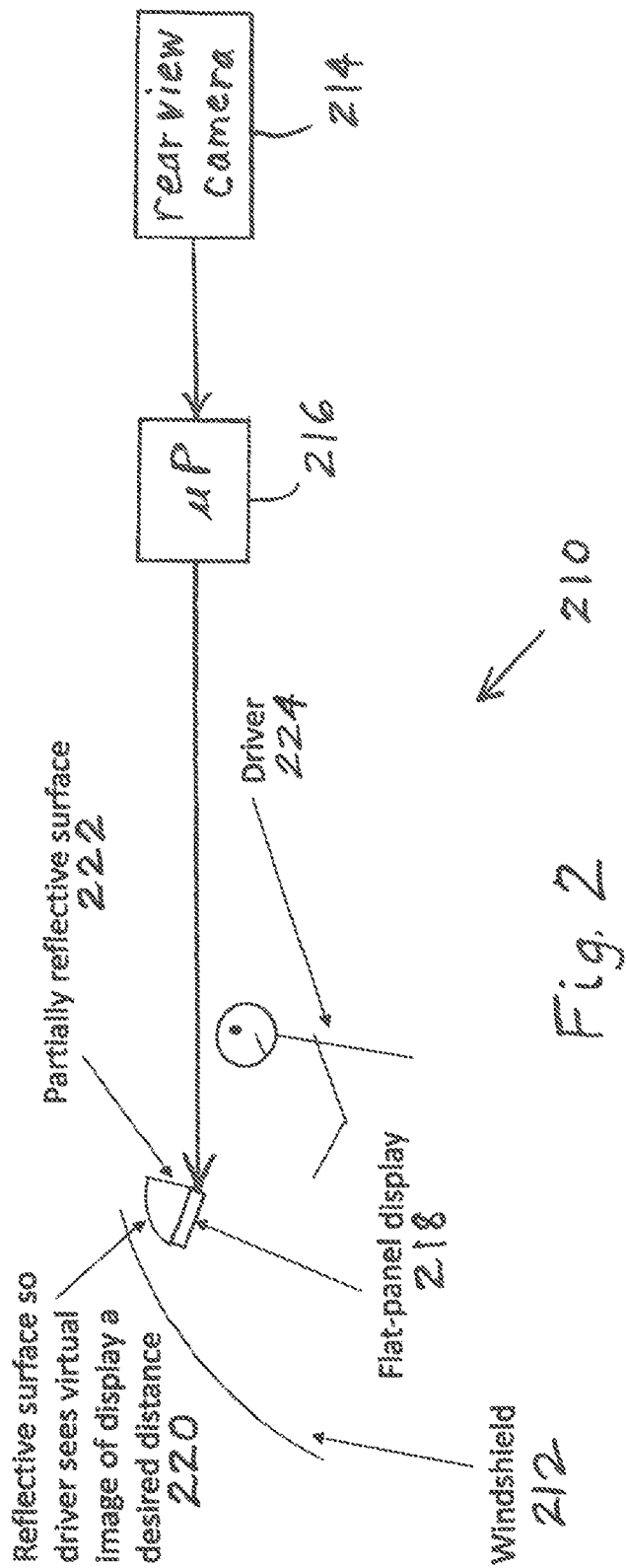
FIG. 2 is a schematic diagram of another embodiment of a rearview head up display arrangement of the present invention.

FIG. 2 illustrates another embodiment of a rearview head up display arrangement 210 of the present invention, including a windshield 212, a rearview camera 214, an electronic processor 216, a flat panel display 218, an arcuate reflective surface 220, and a planar partially reflective surface 222, all of which may be installed on and/or disposed within a same motor vehicle. Arcuate reflective surface 220 may enable a driver 224 to see a virtual image (not shown) of the display at a desired distance from him. Rearview camera 214 may be mounted on a rear bumper of the vehicle, for example, and may capture images of a scene behind the vehicle. The captured images may be transmitted to processor 216 where the images are processed and transformed into a video signal that is transmitted to flat panel display 218. Flat panel display 218 then produces a light-emitting image that faces reflective arcuate surface 220 and that is based upon the received video signal. A portion of the image reflected by arcuate surface 220 reaches driver 224 through partially reflective surface 222, and may appear to driver 224 as a virtual image that may be appear to be disposed outside of or inside of windshield 212. Flat panel display 218, arcuate reflective surface 220, and planar partially reflective surface 222 could be packaged and marketed as an aftermarket head up display.

The virtual image may be simply a reproduction of the images captured by rearview camera 214, or may be mirror images of the images captured by rearview camera 214 to thereby mimic the images seen in a conventional rearview mirror. In addition to a video signal based upon the captured camera images of the rearview scene, the virtual images presented to the driver by the head up display may include alphanumeric text information and icons.

Regardless of whether the embodiment of FIG. 1 or FIG. 2 is implemented, the rearview head up display can have a large enough apparent distance between the driver and the virtual image so that the driver does not need to refocus their eyes when shifting their gaze from the outside front scene to the virtual image that is shown in the rearview head up display. In one embodiment, the rearview head up display shows markers while the vehicle is backing up to help the driver avoid the vehicle hitting objects.

The rearview head up display can show text information, such as speed, time until a traffic light changes, or information about the music being played by the entertainment system. The rearview head up display can also show icons, for example, to warn the driver of an engine condition or that an emergency vehicle is approaching.

The head up display of the present invention may include a combiner. The use of combiners in head up displays is conventionally known. In the present invention, the combiner may be an angled flat piece of glass (e.g., a beam splitter) located directly in front of the driver/viewer that redirects the projected image from the projector in such a way as to enable the driver to see the field of view and the projected infinity image at the same time. The combiner for the rearview head up display could be clear, opaque, or of an intermediate transparency. The transparency of the combiner could be adjustable. One way to adjust the transparency is to use an electrochromic method, such as a method currently used to darken the rearview mirror. In one embodiment, the driver is enabled to manually or orally set the transparency level, opaqueness level or tint of the combiner. In another embodiment, the human-machine interface in the vehicle automatically sets the transparency level, opaqueness level or tint of the combiner. The combiner can have a border to help the driver differentiate the rearview scene from the forward scene. The border can be time-independent or its location can vary as a function of time.

In one embodiment, the rearview head up display arrangement of the present invention may limit the brightness displayed from the headlights of a vehicle approaching from the rear. Advantageously, the maximum brightness output of the rearview display may be maintained at a safe level and cannot be exceeded, no matter how blindingly bright the actual headlights of the other vehicle are.

There are many possible different variations in the implementation of the present invention. These variations may involve combiner transparency, the human-machine interface, methods to add augmented reality functionality, the use of the rearview HUD to display text information, methods to warn the driver of traffic safety hazards, and display features that improve the esthetic appeal of the rearview display by adjusting the color gamut or brightness of the image. There are also many possible ways for the driver to personalize the image that is presented. For example, the field of view presented from the captured camera images can be adjusted.

Figure 3:
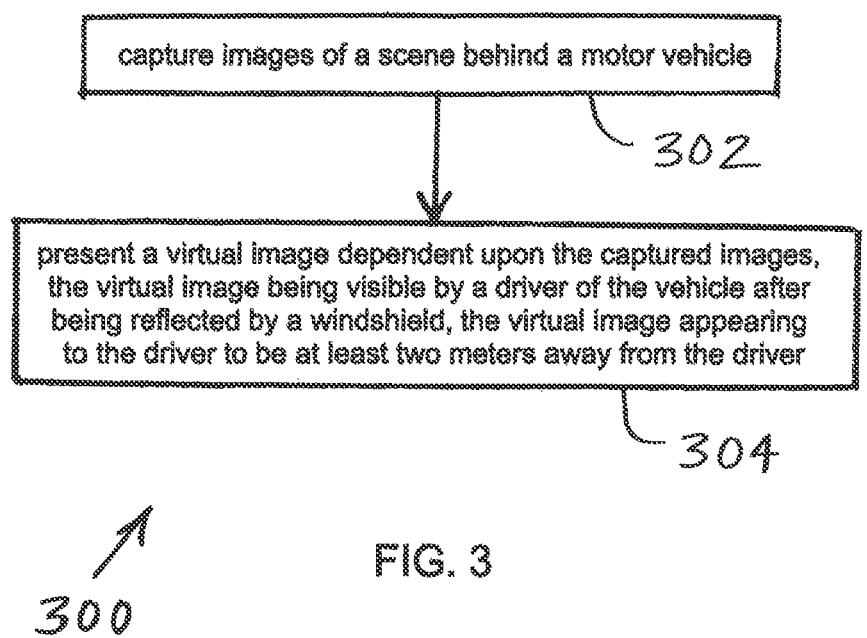
FIG. 3 is a flow chart of one embodiment of a method of the present invention for presenting information to a driver of a motor vehicle having a windshield.

FIG. 3 illustrates one embodiment of a method 300 of the present invention for presenting information to a driver of a motor vehicle having a windshield. In a first step 302, images of a scene behind the motor vehicle are captured. For example, rearview camera 14 may capture images of the road in back of a motor vehicle.

In a next step 304, a virtual image is presented dependent upon the captured images. The virtual image is visible by a driver of the vehicle after being reflected by the windshield. The virtual image appears to the driver to be at least two meters away from the driver. For example, virtual image 24 may be presented dependent upon the images captured by rearview camera 14. Virtual image 24 may be visible by a driver 22 of the vehicle after being reflected by windshield 12. Virtual image 24 may appear to driver 22 to be at least two meters away from driver 22.

The foregoing description may refer to "motor vehicle", "automobile", "automotive", or similar expressions. It is to be understood that these terms are not intended to limit the invention to any particular type of transportation vehicle. Rather, the invention may be applied to any type of transportation vehicle whether traveling by air, water, or ground, such as airplanes, boats, etc.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A motor vehicle comprising:
a windshield;
a rearview camera configured to capture images of a scene behind the motor vehicle:
an electronic processor configured to receive the images captured by the camera; and
a virtual image projection arrangement communicatively coupled to the electronic processor and configured to present a virtual image based on a mirror image of at least one of the images captured by the rearview camera, the virtual image being visible by a driver of the vehicle after being reflected by the windshield.

2. The vehicle of claim 1 wherein the virtual image projection arrangement includes a head up display.

3. The vehicle of claim 1 wherein the virtual image appears to the driver to be disposed at a distance of at least one foot beyond the windshield.

4. The vehicle of claim 1 wherein the virtual image appears to the driver to be visible through the windshield.

5. The vehicle of claim 1 wherein the virtual image appears to be disposed in a same direction relative to the driver's eyes as a conventional rearview mirror would be.

6. The vehicle of claim 1 wherein the virtual image includes alphanumeric text information and/or an icon.

7. A method of presenting information to a driver of a motor vehicle having a windshield, the method comprising the steps of:
capturing images of a scene behind the motor vehicle; and
presenting a virtual image based on a mirror image of the captured image, the virtual image being visible by a driver of the vehicle after being reflected by the windshield, the virtual image appearing to the driver to be at least two meters away from the driver.

8. The method of claim 7 wherein the virtual image is presented by a head up display.

9. The method of claim 7 wherein the images are captured by a camera mounted on a rear bumper of the motor vehicle.

10. The method of claim 7 wherein the virtual image appears to the driver to be visible through the windshield.

11. The method of claim 7 wherein the virtual image is visible below and adjacent to a top edge of the windshield and at a midpoint of the top edge of the windshield.

12. The method of claim 7 wherein the virtual image includes alphanumeric text information and/or an icon.

13. A motor vehicle comprising:
a rearview camera configured to capture images of a scene behind the motor vehicle;
an electronic processor configured to receive the images captured by the camera and produce a video signal based upon the captured images;
a flat panel display communicatively coupled to the electronic processor and configured to receive the video signal and produce a light field dependent upon the video signal;
a concavely curved reflective surface positioned to reflect the light field toward eyes of a driver of the motor vehicle; and
a partially reflective surface positioned to pass a portion of the reflected light field to the driver.

14. The vehicle of claim 13 wherein the reflected light field appears to the driver to be virtual image disposed at a distance of at least two meters from the driver.

15. The vehicle of claim 14 wherein the virtual image appears to the driver to be visible through the windshield.

16. The vehicle of claim 14 wherein the virtual image appears to be disposed in a same direction relative to the driver's eyes as a conventional rearview mirror would be.

17. The vehicle of claim 14 wherein the virtual image includes alphanumeric text information and/or an icon.

18. The vehicle of claim 13 wherein the partially reflective surface is planar.

* * * * *